(12) United States Patent
Dixon

(10) Patent No.: US 8,172,271 B2
(45) Date of Patent: May 8, 2012

(54) HOSE COUPLING LOCKING MECHANISM

(76) Inventor: Randy J. Dixon, Billings, MT (US)

( * ) Notice: Subject to any disclaimer, the term of this patent is extended or adjusted under 35 U.S.C. 154(b) by 308 days.

(21) Appl. No.: 12/562,418

(22) Filed: Sep. 18, 2009

(65) Prior Publication Data
US 2010/0072745 A1 Mar. 25, 2010

Related U.S. Application Data

(60) Provisional application No. 61/098,144, filed on Sep. 18, 2008.

(51) Int. Cl.
F16J 15/00 (2006.01)

(52) U.S. Cl. ............ 285/82; 285/91; 285/312; 285/320; 403/326

(58) Field of Classification Search .................. D8/331, D8/343, 336, 338; 24/462; 248/316.7, 230.7, 248/231.81, 231.85, 229.26, 73; 285/81–88, 285/91, 311, 312, 313, 320; 292/297, 298, 292/80, 82, 303, 340, 14–19; 16/231, 250, 16/21, 297, 342; 403/330, 374.5, 326, 329, 322.4
See application file for complete search history.

(56) References Cited

U.S. PATENT DOCUMENTS

| | | | | |
|---|---|---|---|---|
| 3,439,942 A * | 4/1969 | Moore et al. | ..................... | 285/80 |
| 4,295,670 A * | 10/1981 | Goodall et al. | ................. | 285/91 |
| 5,458,502 A * | 10/1995 | Joly | ............................... | 439/397 |
| 5,791,694 A * | 8/1998 | Fahl et al. | ........................ | 285/38 |
| 5,904,380 A * | 5/1999 | Lee | ................ | 285/312 |
| 5,911,445 A * | 6/1999 | Lee | ................. | 285/84 |
| 6,015,168 A * | 1/2000 | Fahl | ................................ | 285/81 |
| 6,047,995 A * | 4/2000 | Kotake | ........................... | 285/85 |
| 6,447,016 B2 * | 9/2002 | Collier | ............................ | 285/81 |
| 2010/0270791 A1 * | 10/2010 | Lee | ................. | 285/85 |

* cited by examiner

Primary Examiner — James Hewitt
Assistant Examiner — Jay R Ripley
(74) Attorney, Agent, or Firm — Sheridan Ross P.C.

(57) ABSTRACT

A locking clip for use with a hose coupling is provided that includes a first member and a second member that grasp and maintain a locking arm of a locking mechanism commonly used in conjunction with hose couplings.

18 Claims, 7 Drawing Sheets

HOSE COUPLING LOCKING MECHANISM

This application claims the benefit of U.S. Provisional Patent Application Ser. No. 61/098,144, filed Sep. 18, 2009, the entire disclosure of which is incorporated by reference herein.

FIELD OF THE INVENTION

Embodiments of the present invention are generally related to couplings for interconnecting hoses or additional couplings. More specifically, embodiments of the present invention are directed to a device that prevents a hose or coupling from disengaging a locking coupling.

BACKGROUND OF THE INVENTION

With reference to the prior art as shown in FIG. 1, hose couplings 2 generally comprise a male portion 4 and a female portion 18 wherein the male portion 14 is interconnected to a hose for transferring gasses or fluids. Often, the male portion 14 includes a plurality of ribs positioned on its outer surface that engages an inner diameter of an interconnected hose. In operation, the male portion 14 is inserted into the hose and the coupling 2 is secured to the hose by a clamp positioned around the outer diameter of the hose. The female portion 18 of hose coupling 2 is used to selectively interconnect to another coupling, a hose, etc.

Often, the coupling 2 includes a locking mechanism 22 is used to selectively apply pressure to an exterior wall of the interconnected hose to secure the hose and the hose coupling 2. Alternatively, the locking mechanism 22 is used to interconnect the coupling 2 to another coupling by locking the two couplings together. The locking mechanism 22 often employs a bulbous locking end 12 that is associated to a locking arm 22 that is rotatably interconnected to a clevis 54 of the coupling 2. In an unlocked position of use, the locking arm 22 is rotated away from the male portion which positions the locking end out of the female portion 18. In a locked position of use, the locking arms are positioned adjacent to the male portion, thereby positioning the locking end within the female portion to engage the hose. The locking mechanism 22 is typically secured to the coupling 2 when it is in the locked position to prevent unintended movements of the locking arms 22 and inadvertent disconnection of the hose from the coupling 2. One method of securing the locking mechanism is to employ a cotter pin 30, that prevents the locking mechanism 22 from releasing the hose by maintaining the locking mechanism in a locked position.

To disconnect the hose from the coupling 2, the cotter pin 30, must be removed, which may be difficult. More specifically, operators typically wear thick protective gloves that limit dexterity, thereby making it difficulty to remove the cotter pin 30 from the locking mechanism 22. The cotter pin 30 also allows considerable movement of the locking mechanism, which may allow the hose to disconnect from the coupling 2. In addition, the cotter pin 30 is easy to lose because it is usually not connected to the body of the coupling 2.

Thus, a significant need exists for a safety device that maintains the locking mechanism in a locking configuration, yet allows an operator to release the locking mechanism if necessary even if the operator is wearing safety equipment such as thick gloves. A need also exists to reduce the amount of travel of the locking mechanism, thereby providing a firm and secure connection. To minimize the cost associated with replacing existing hose couplings, it is desirous to provide a locking device that may be retrofitted onto existing hose couplings while maintaining the structural integrity thereof. It would also be desirable to alleviate the difficulty of releasing the locking mechanism so that the operator may maintain control of the hose coupling and hose. Furthermore, it would be desirable for the safety device to be interconnected to the hose coupling, thereby reducing loss and the replacement costs associated therewith.

SUMMARY OF THE INVENTION

Accordingly, it is one aspect of the present invention to provide a safety device for securing a locking mechanism of a hose coupling while allowing an operator to easily release the safety device to uncouple the hose coupling from an interconnected hose or coupling. Thus one embodiment of the present invention includes a hose coupling lock retention mechanism that allows the operator to quickly release the locking mechanism from the hose coupling while wearing safety equipment.

It is another aspect of the present invention to provide a safety device that limits the amount of travel of the locking mechanism, which helps prevent the hose from disconnecting from the hose coupling, for example.

It is another aspect of the present invention to provide a hose coupling locking clip that is adapted for constraining locking arms of a hose coupling that includes a clevis portion with a rotatably interconnected locking arm, comprising: a plate having a right edge with a right wall extending therefrom and a left wall with a left wall extending therefrom, the distance between the left edge and the right edge defining a first width; a left locking shoulder having a first edge and a second edge, the first edge interconnected to the left wall wherein the left locking shoulder is angled with respect to the left wall; a right locking shoulder having a first edge and a second edge, the first edge interconnected to the right wall wherein the right locking shoulder is angled with respect to the right wall and wherein a second distance between the second edge of the left locking shoulder and the second edge of the right locking shoulder is less than the first distance; a left locking wing wall interconnected to the second edge of the left locking shoulder, the left locking wing wall angled with respect to the left locking shoulder in a direction toward the left wall; a right locking wing interconnected to the second edge of the right locking shoulder, the right wing angled with respect to the right locking shoulder in a direction toward the right wall; a left clevis plate interconnected to the left locking shoulder and generally parallel thereto; a right clevis plate interconnected to the right locking shoulder and generally parallel thereto; a left retention tab interconnected to the left clevis plate about 90 degrees relative thereto; a right retention tab interconnected to the right clevis plate about 90 degrees relative thereto; wherein the left clevis plate and the right clevis plate are adapted to be associated with the clevis of the hose coupling with the locking arm positioned therebetween; and wherein when the locking arm of the hose coupling is positioned adjacent to the plate, the left locking shoulder and the right locking shoulder prevent movement of the locking arm without deflection of the left locking wing wall and the right locking wing. It is contemplated that the plate, the left wall, the right wall, the left clevis plate, the right clevis plate, the left locking wing, the right locking wing, the left locking shoulder and the right locking shoulder may be fabricated from a single sheet metal member. Further, in some embodiments, the angle between the left shoulder and the left wall is about 145 degrees, the angle between the right shoulder and the right wall is about 145 degrees, the angle between the left wing wall and the left shoulder is about 100 degrees, and the angle between the right wing wall and the right shoulder is about 100 degrees.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
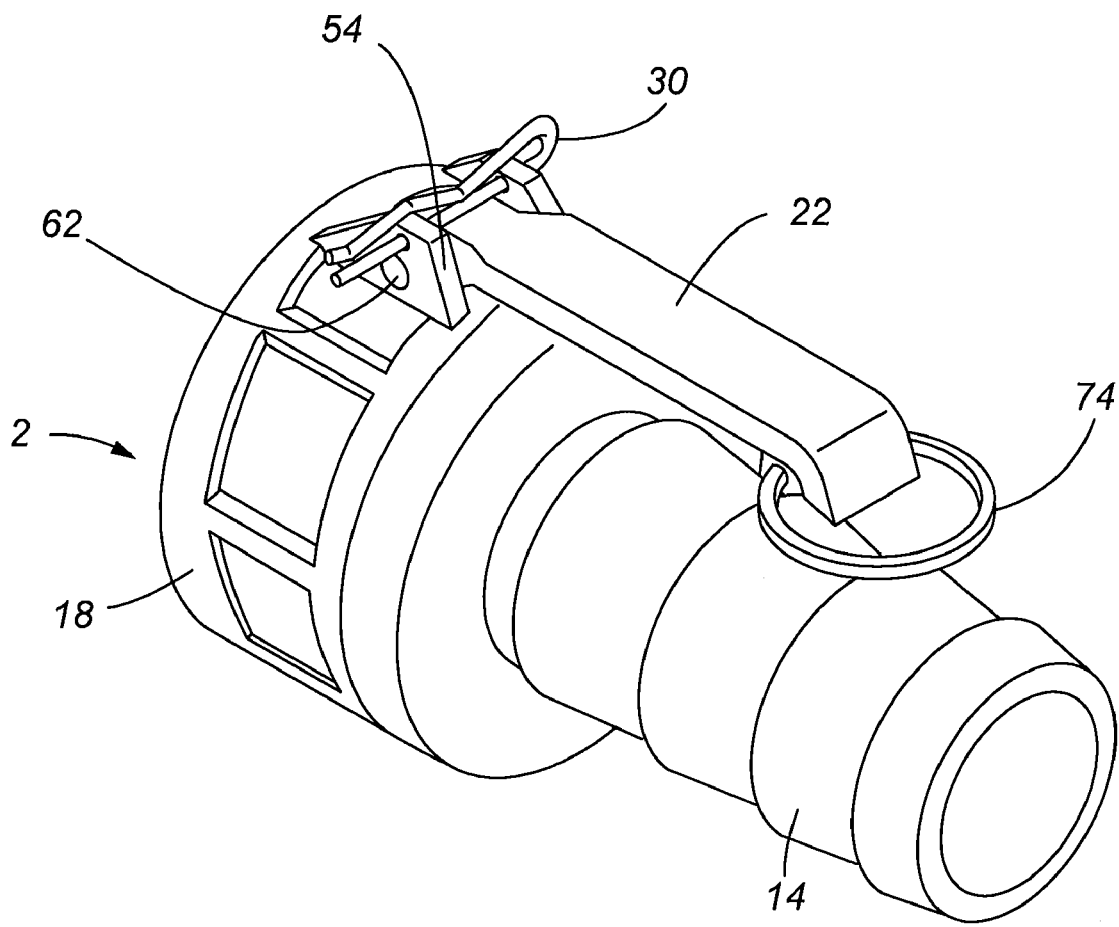
FIG. 1 is a perspective view of a prior art hose coupling showing a cotter pin that is traditionally used to restrain a locking arm.
Figure 2:
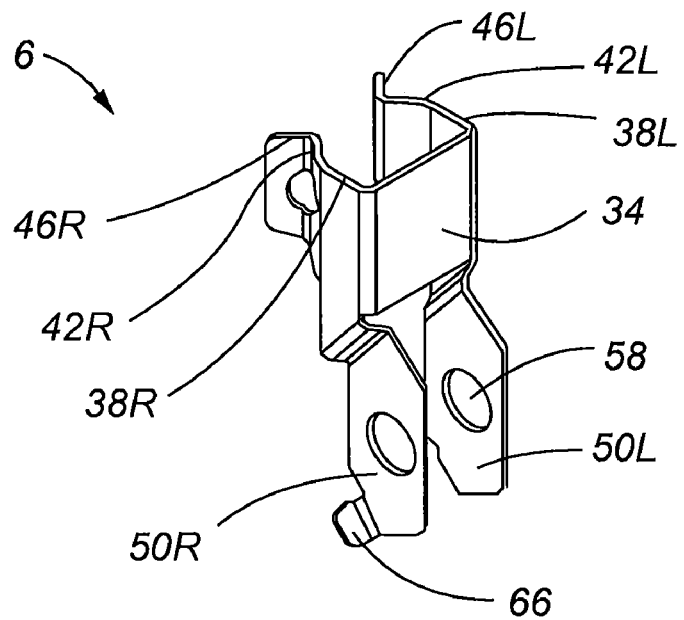
FIG. 2 is a front perspective view of the locking clip of one embodiment of the present invention.
Figure 3:
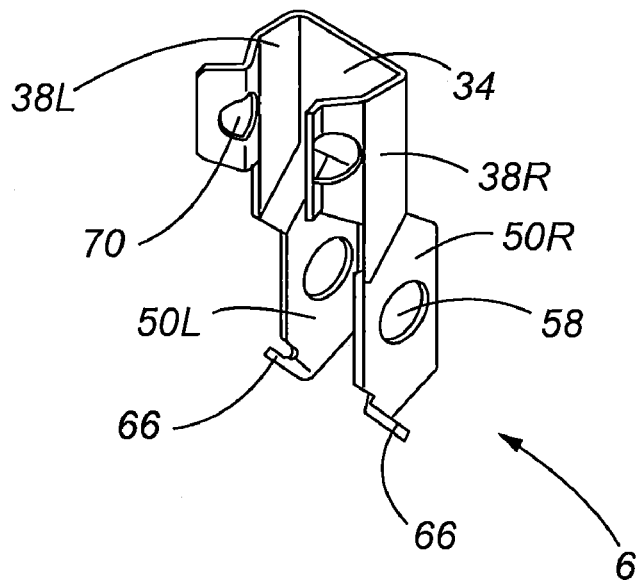
FIG. 3 is a rear perspective view of the locking clip of one embodiment of the present invention.
Figure 4:
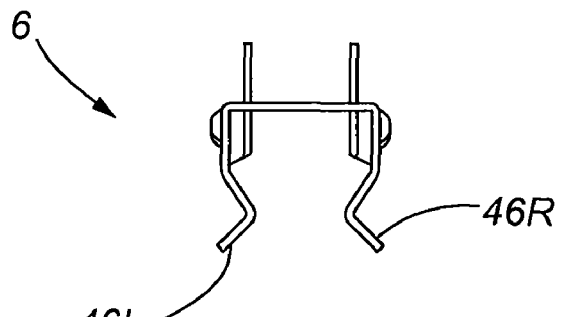
FIG. 4 is a top plan view of the locking clip of one embodiment of the present invention.
Figure 5:
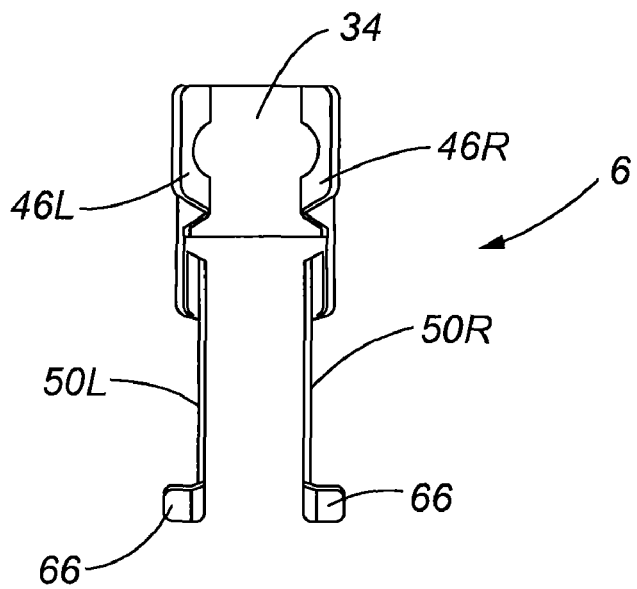
FIG. 5 is a front elevation view of the locking clip of one embodiment of the present invention.
Figure 6:
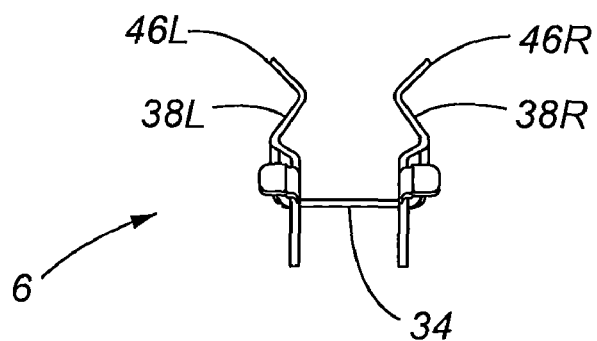
FIG. 6 is a bottom plan view of the locking clip of one embodiment of the present invention.
Figure 7:
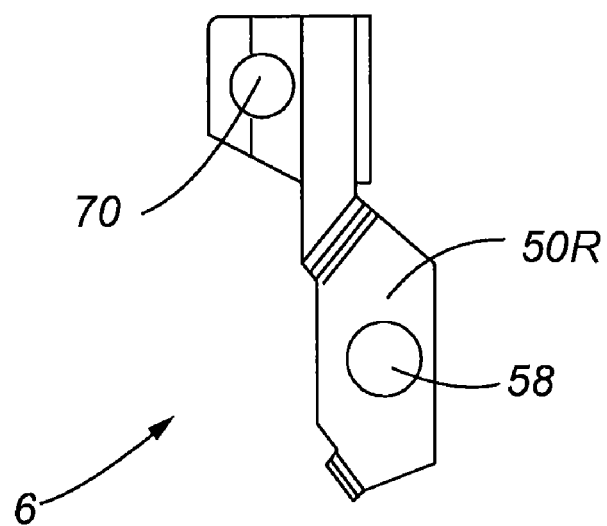
FIG. 7 is a left elevation view of the locking clip of one embodiment of the present invention.
Figure 8:
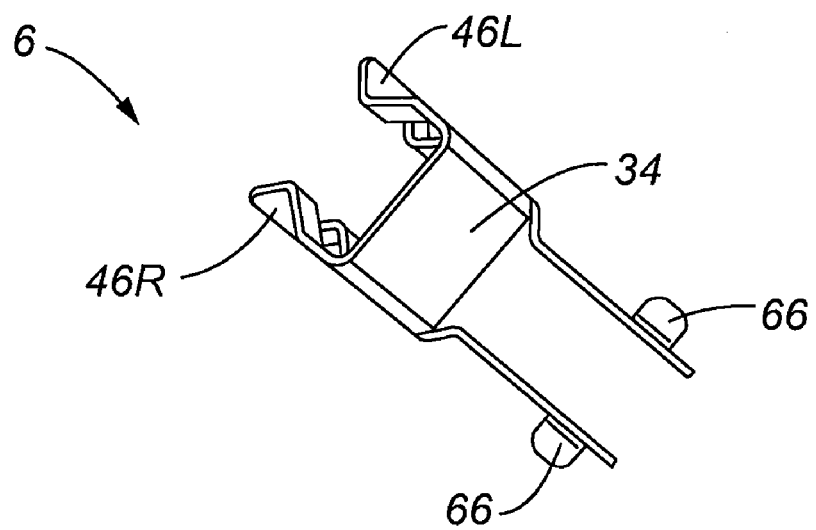
FIG. 8 is an auxiliary view of FIG. 7.

To assist in the understanding of the present invention the following list of components and associated numbering found in the drawings is provided herein:

| # | Components |
|---|---|
| 2 | Hose coupling |
| 6 | Locking clip |
| 12 | Locking arm end |

-continued

| # | Components |
|---|---|
| 14 | Male portion |
| 18 | Female portion |
| 22 | Locking arm |
| 26 | Locking arm end |
| 30 | Cotter pin |
| 34 | Plate |
| 38L | Left locking wall |
| 38R | Right locking wall |
| 42L | Left locking shoulder |
| 42R | Right locking shoulder |
| 46L | Left locking wing |
| 46R | Right locking wing |
| 50L | Left clevis plate |
| 50R | Right clevis plate |
| 54 | Clevis |
| 58 | Aperture |
| 62 | Pin |
| 66 | Retention tab |
| 70 | Aperture |
| 74 | Ring |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 13:
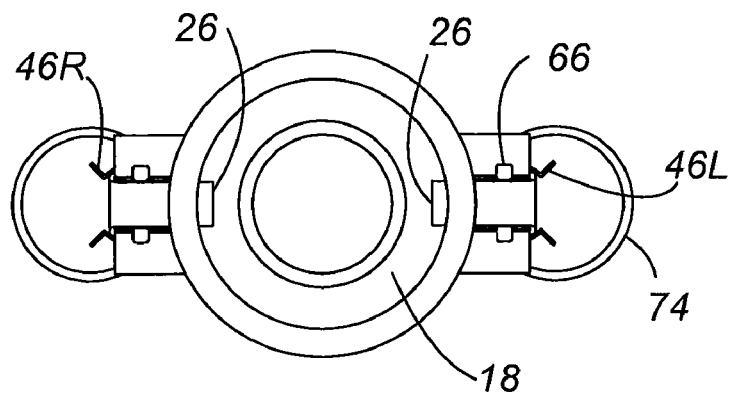
FIG. 13 is a front elevation view of a hose coupling shown in FIG. 12.

Referring now to FIGS. 1-13 a hydraulic coupling 2 of one embodiment of the present invention is shown that includes a safety device 6. The hose coupling 12 includes a male portion 14 and a female portion 18, wherein the male portion 14 is adapted to fit into a hose (not shown) and the female portion 18 is adapted to receive a hose (not shown). The hose coupling 2 includes at least one locking arm 22 which is rotatably interconnected adjacent to the female end 18 of the hose coupling 2. In a first, locked position of use, an end 26 of the locking arm 22 is positioned within the female portion 18 of the hose coupling 2 (See FIG. 13). In this configuration, the locking arm end 26 contacts an outer surface of a hose, for example, thereby preventing removal of the hose from the female portion 18 of the hose coupling 2. In order to maintain the locking arm 22 in the locked position, a cotter pin 30 is traditionally used that prevented the locking arm 22 from rotating outwardly which removes the locking arm end 22 from the female portion 18. In order to address various issues related to the drawbacks of using a cotter pin 30 described above, a locking clip 6 (i.e. safety device) is employed.

Referring now to FIGS. 2-8, the locking clip 6 of one embodiment of the present invention is shown. The locking clip 6 includes a plate 34 having a left locking wall 38L and a right locking wall 38R. The locking walls 38 have portions that are bent inwardly towards the center of the plate 34 to form a right locking shoulder 42R and a left locking shoulder 42L. A left locking wing 46L and a right locking wing 46R are interconnected to the left locking shoulder 42L and the right locking shoulder 42R, respectively. The locking wings 46 are designed to engage the locking arm as it is rotated to the locked position to facilitate deflection of the locking shoulders 42, which allow the locking arm 22 to be further rotated to the locked position. One of skill in the art will appreciate that locking wings may not be required. For example, the shape of the locking arm may facilitate deflection of the locking shoulders.

Extending from each of the locking walls 38 is a clevis plate 50. More specifically, a left clevis plate 50L and a right clevis plate 50R. The clevis plates 50 are designed to interface with a clevis 54 (see FIG. 9, for example) traditionally found on hydraulic couplings. An aperture 58 is provided through the left clevis plate 50L and the right clevis plate 50R that is designed to receive a securing pin 62 (see FIG. 12, for example). The pin 62 is positioned through a first portion of the clevis 54, the left clevis plate 50L, the locking arm 22, the right clevis plate 50R and the second portion of the clevis 54. At least one of the clevis plates 50 includes a retention tab 66 that engages an outer portion of the clevis 54 to prevent rotation of the locking clip 6 relative to the hose coupling. At least one of the locking walls 38, locking shoulders 42, and locking wings 46 may also include an aperture 70 for receiving a cotter pin (not shown) to provide additional security.

Referring now to FIGS. 9-12, one embodiment of the present invention is shown interconnected to a hose coupling 2. More specifically, the locking clip 6 is placed within a clevis 54 wherein the locking arm 22 is rotatably interconnected via the pin 62 to the clevis 54. The plate 34 of the locking clip 6 is engaged onto the female portion 18 of the hose coupling 2 and is rotatably maintained in place by the retention tab 66, which contact the clevis 54.

To install the locking clip 6, i.e., to retrofit traditional couplings 2 as shown in FIG. 1, the pin 62 and locking arm 22 are removed from the clevis 54. The locking clip 6 is then placed within the clevis 54 and the locking arm 22 and the pin 63 are replaced. The locking arm 22 is able to rotate within the clevis 54 as it was able to prior to the integration of the locking clip 6. One of skill in the art will appreciate that the locking clip may be devoid of the plate wherein a clevis plate associated locking walls and locking shoulders are associated with one portion of the clevis 54. Two locking clip halves, would then work in concert to selectively secure the locking arm. The locking clip halves may be welded or otherwise attached to the clevis. Alternatively, the locking clip halves may be integrated into the clevis.

To lock a hose or other coupling to the coupling, the locking arm 22 is rotated such that at least one locking arm end 26 is placed within the female portion 18 of the hose coupling 2. In order to completely locate the locking arm end 26 within the female portion 18 of the hose coupling 2, the locking arm 22 must generally lie parallel to a center line of the hose coupling 2. To achieve this orientation, the locking arm 22 is placed adjacent to the plate 34 of the locking clip. In operation, the locking arm 22 is rotated a predetermined amount until it contacts the wing walls 46 of the locking clip 6. Force applied to the locking arm 22 resiliently deflects the wing walls 46 outwardly which allows the locking arm 22 to be positioned adjacent to the plate 34. Once the locking arm 22 is in the locked position of use adjacent to the plate 34, the wing walls 46 will resiliently deflect back to their original location, thereby positioning the shoulders 42 above the locking arm 22. The locking arm 22 is thus positioned between the shoulders 42 and the plate 34 such that it is not easily rotated back to an open configuration.

Figure 9:
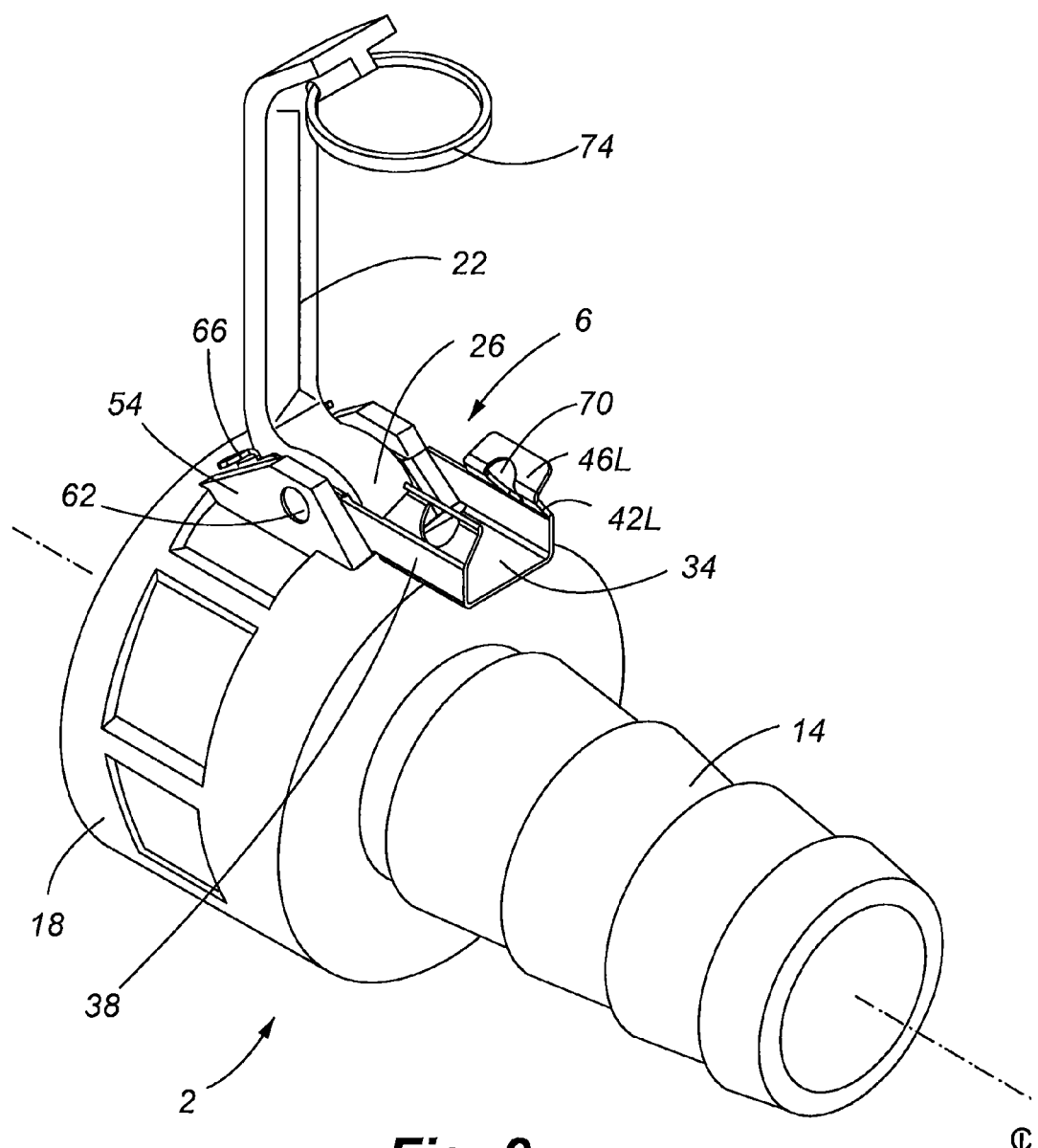
FIG. 9 is a perspective view of the hose coupling with interconnected locking clip wherein the locking arm is situated in an open position of use.
Figure 10:
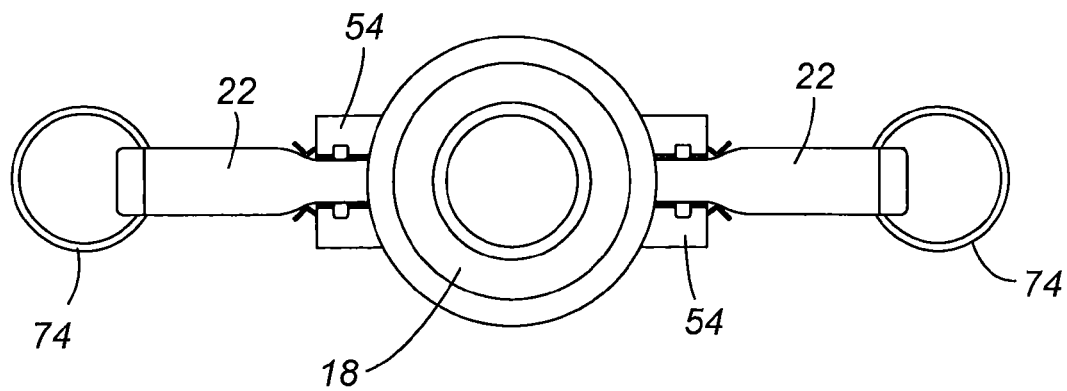
FIG. 10 is a perspective view of the hose coupling with interconnected locking clip maintaining the locking arm in a locked position of use.
Figure 11:
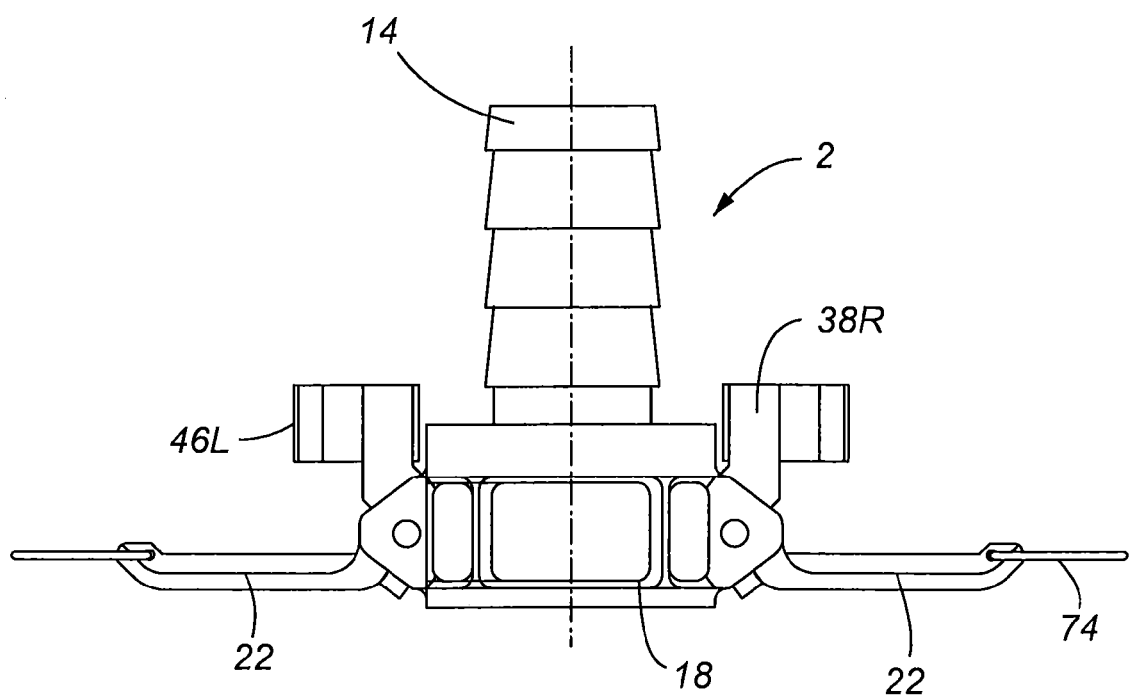
FIG. 11 is a side elevation view of FIG. 10.
Figure 12:
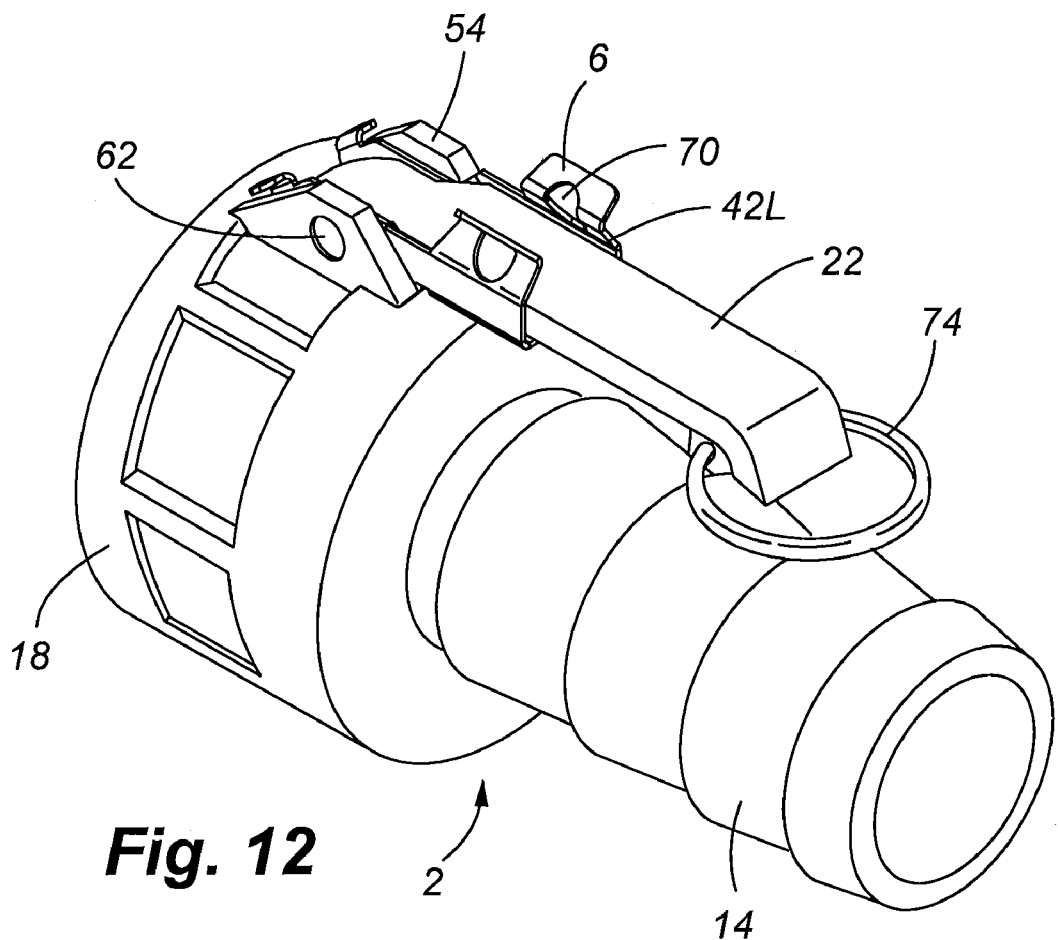
FIG. 12 is a front perspective view of the hose coupling where the locking arms are positioned in an open position of use that allows for insertion of a hose within the hose coupling.

To allow the interconnected hose or other coupling to be removed from the hose coupling 2, the locking arm 22 must be rotated to a first, unlocked position of use as shown in FIG. 9. In order to achieve this, the locking arm 22 must be rotated past the shoulders 42. Rotation of the locking arm 22 to the unlocked position will bear the locking arm 22 against the shoulders 42 of the locking clip 6. As force is applied, the shoulders 42 will resiliently deflect to the walls 38 outwardly to allow the locking arm ends 22 to be removed from the locking clip. In order to facilitate the removal of the locking arm 22 from the locking clip 6, a ring 74 may be employed, which provides a convenient gripping member. The ring 74 also helps facilitate removal of the locking arm 22 from the locking clip 6 when individuals are wearing gloves or other safety gear.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A hose coupling locking clip adapted for constraining locking arms of a hose coupling that includes a clevis portion with a rotatably interconnected locking arm, comprising:
   a plate having a right edge with a right wall extending therefrom and a left edge with a left wall extending therefrom;
   a left shoulder interconnected to said left wall;
   a right shoulder interconnected to said right wall;
   wherein said left shoulder is a wall that is angled relative to said left wall and said right shoulder is a wall that angled relative to said right wall, wherein said left shoulder and said right shoulder are angled towards each other;
   wherein when the locking arm of the hose coupling is positioned adjacent to said plate, said left shoulder and said right shoulder prevent movement of the locking arm;
   a left clevis plate interconnected to said left wall;
   a right clevis plate interconnected to said right wall, said left clevis plate and said right clevis plate being adapted to be associated with the clevis portion of the hose coupling with the locking arm positioned between said left clevis plate and said right clevis plate;
   wherein said right clevis plate and said left clevis plate include an aperture for receiving a pin that rotatably interconnects the locking arm with the clevis portion;
   wherein each clevis plate has a retention means for engaging the clevis portion to prevent rotation of the locking clip relative to the hose coupling;
   and
   wherein when the locking arm of the hose coupling is positioned adjacent to said plate, said left shoulder and said right shoulder restricts movement of the locking arm.

2. The hose coupling locking clip of claim 1, wherein said left shoulder and said right shoulder are spaced a first width apart that is less than the width of said plate.

3. The hose coupling locking clip of claim 1, wherein said plate, said left wall, said right wall, said left clevis plate, said right clevis plate, said left wing wall, said right wing wall, said left shoulder and said right shoulder are fabricated from a single sheet metal member.

4. The hose coupling locking clip of claim 1, further comprising:
   a left wing wall interconnected to said left shoulder, said left wing wall angled with respect to said left shoulder; and a right wing wall interconnected to said right shoulder, said right wing wall angled with respect to said right shoulder, wherein said left wing wail and said right wing wall are angled away from each other.

5. The hose coupling locking clip of claim 4, wherein the angle between said left shoulder and said left wall is about 145 degrees, the angle between said right shoulder and said right wall is about 145 degrees, the angle between said left wing wail and said left shoulder is about 100 degrees, and the angle between said right wing wall and said right shoulder is about 100 degrees.

6. The hose coupling locking clip of claim 4, wherein at least one of said left wall, said right wall, said left wing wall, said right wing wall, said left shoulder and said right shoulder include an aperture for receiving a pin.

7. A hose coupling locking clip adapted for constraining locking arms of a hose coupling that includes a clevis portion with a rotatably interconnected locking arm, comprising:
a plate having a right edge with a right wall extending therefrom and a left edge with a left wall extending therefrom, the distance between said left edge and said right edge defining a first width;
a left locking shoulder having a first edge and a second edge, said first edge interconnected to said left wall wherein said left locking shoulder is angled with respect to said left wall;
a right locking shoulder having a first edge and a second edge, said first edge interconnected to said right wall wherein said right locking shoulder is angled with respect to said right wall and wherein a second distance between said second edge of said left locking shoulder and said second edge of said right locking shoulder is less than said first distance;
a left locking wing wall interconnected to said second edge of said left locking shoulder, said left locking wing wall angled with respect to said left locking shoulder in a direction toward said left wall;
a right locking wing interconnected to said second edge of said right locking shoulder, said right wing angled with respect to said right locking shoulder in a direction toward said right wall;
a left clevis plate interconnected to said left wall and generally parallel thereto;
a right clevis plate interconnected to said right wall and substantially parallel thereto;
a left retention tab projecting outward from said left clevis plate about 90 degrees relative thereto for engaging the clevis portion;
a right retention tab projecting outwardly from said right clevis plate about 90 degrees relative thereto for engaging the clevis portion;
wherein said left clevis plate and said right clevis plate are adapted to be associated with the clevis portion of the hose coupling with the locking arm positioned therebetween; and
wherein when the locking arm of the hose coupling is positioned adjacent to said plate, said left locking shoulder and said right locking shoulder prevent movement of the locking arm without deflection of said left locking wing wall and said right locking wing.

8. The hose coupling locking clip of claim 7, wherein said plate, said left wall, said right wall, said left clevis plate, said right clevis plate, said left locking wing, said right locking wing, said left locking shoulder and said right locking shoulder are fabricated from a single sheet metal member.

9. The hose coupling locking clip of claim 7, wherein at least one of said left wall, said right wall, said left clevis plate, said right clevis plate, said left locking wing, said right locking wing, said left locking shoulder and said right locking shoulder include an aperture for receiving a pin.

10. A hose coupling locking system with a hose coupling that includes a female portion for receiving a fluid conveying member, said female portion having an opening, said hose coupling also including a locking arm with a locking arm end that is rotatably interconnected to said female portion by way of a pin and clevis, wherein said locking arm is capable of moving from a first position of use where said locking arm end is positioned through said opening and in engagement with the fluid conveying member and a second position of use wherein said locking arm end is positioned such that the fluid conveying member is capable of freely interconnecting or disconnecting from said female portion, further comprising:
a first locking member having a first clevis wall with an aperture therethrough that is positioned between said clevis and one side of said locking arm with said pin extending through said first clevis wall;
a first wall interconnected to and extending from said first clevis wall;
a first shoulder wall interconnected to and extending at an angle relative to said first wall such that when said locking arm is in said first position of use, said first shoulder wall prevents said locking arm from moving to said second position of use;
a second locking member having a second clevis wall with an aperture therethrough that is positioned between said clevis and one side of said locking arm opposite said first clevis wall with said pin extending through said second clevis wall;
a second wall interconnected to and extending from said second clevis wall; and
a second shoulder wall interconnected to and extending at an angle relative to said second wall such that when said locking arm is in said second position of use, said second shoulder wall also prevents said locking arm from moving to said second position of use.

11. The hose coupling locking system with a hose coupling of 10, wherein at least one of said first clevis wall and said second clevis wall include a retention tab interconnected to an end opposite to the end that is interconnected to said respective shoulder wall, said retention tab for engaging said respective clevis to substantially prevent rotation of at least one aid first locking member and said second locking member.

12. The hose coupling locking system with a hose coupling of 10, wherein at least one of said first clevis wall and said second clevis wall is integrated onto its respective clevis side.

13. The hose coupling locking system with a hose coupling of 10, wherein said first shoulder wall that is angled relative to said first wall and said second shoulder wall is a wall that is angled relative to said second wall, wherein said first shoulder wall and said second shoulder wall are angled towards each other; and
further comprising:
a first wing wall interconnected to said first shoulder wall, said first wing wall angled with respect to said first shoulder wall; and
a second wing wall interconnected to said second shoulder wall, said second wing wall angled with respect to said second shoulder wall, wherein said first wing wall and said second wing wall are angled away from each other.

14. The hose coupling locking system with a hose coupling of 13, wherein the angle between said first shoulder wall and said first wall is about 145 degrees, the angle between said second shoulder wall and said second wall is about 145 degrees, the angle between said first wing wall and said first shoulder wall is about 100 degrees, and the angle between said second wing wall and said second shoulder wall is about 100 degrees.

15. The hose coupling locking system with a hose coupling of 10, wherein said first shoulder wall and said second shoulder wall are interconnected by a plate.

16. The hose coupling locking system with a hose coupling of claim 15, wherein said first shoulder wall and said second shoulder wall are spaced a first width apart that is less than the width of said plate.

17. The hose coupling locking system with a hose coupling of claim 15, wherein said plate, said first wall, said second wall, said first clevis wall, said second clevis wall, said first wing wall, said second wing wall, said first shoulder wall and said second shoulder wall are fabricated from a single sheet metal member.

18. The hose coupling locking system with a hose coupling of claim 15, wherein at least one of said first wall, said second wall, said first wing wall, said second wing wall, said first shoulder wall and said second shoulder wall include an aperture for receiving a pin.

* * * * *